United States Patent [19]
Clark, II et al.

[11] Patent Number: 5,546,979
[45] Date of Patent: Aug. 20, 1996

[54] DEVICE FOR DRAINING FLUID FROM A CONTAINER

[75] Inventors: James E. Clark, II, Ojai, Calif.; Poul Van Santen, Rotterdam, Netherlands

[73] Assignee: Clark Technology Systems, Inc., Santa Paula, Calif.

[21] Appl. No.: 384,946

[22] Filed: Feb. 7, 1995

Related U.S. Application Data

[63] Continuation-in-part of Ser. No. 300,402, Sep. 2, 1994.

[51] Int. Cl.$^6$ ............ F01M 11/04; F16K 24/02
[52] U.S. Cl. ........ 137/318; 123/196 A; 123/196 R; 137/322; 137/614.04; 141/65; 141/98; 141/330; 141/346; 184/1.5; 210/248; 210/416.5; 222/91; 222/559; 251/149.5; 408/226; 408/227
[58] Field of Search ............ 137/317, 318, 137/322, 544, 547, 549, 550, 614.04; 7/100, 142, 158, 170; 81/3.08, 3.2, 3.45; 123/196 R, 196 A, 196 S; 141/65, 98, 329, 330, 346, 383; 210/248, 416.5; 184/1.5; 408/226, 227; 222/91, 544, 559; 251/149.5

[56] References Cited

U.S. PATENT DOCUMENTS

| | | | |
|---|---|---|---|
| 552,408 | 12/1895 | Barnes | 137/318 |
| 1,818,122 | 8/1931 | Engbrecht | 184/1.5 |
| 2,184,263 | 12/1939 | Adler | 222/91 |
| 3,072,138 | 1/1963 | Fabian et al. | 137/318 |
| 3,509,905 | 5/1970 | Mullins | 137/318 |
| 4,137,930 | 2/1979 | Scholle | 137/614.04 |
| 4,177,529 | 12/1979 | Sikula, Jr. | 81/3.08 |
| 4,269,237 | 5/1981 | Berger | 184/1.5 |
| 4,672,932 | 6/1987 | Schmidt | 123/196 R |
| 4,676,281 | 6/1987 | Nord | 184/1.5 |
| 4,776,431 | 10/1988 | Poling | 210/416.5 |
| 5,299,714 | 4/1994 | Kilgore | 7/100 |

*Primary Examiner*—George L. Walton
*Attorney, Agent, or Firm*—Drucker & Sommers

[57] ABSTRACT

A fluid container draining device for draining fluid from a fluid container, such as an oil filter, in a controlled manner. It has a front threaded screw with a sharpened drill tip. It has an internal channel communicating between an opening at the forward end of the screw and a rear region of the threaded screw. A fluid valve is positioned at the rear region of the screw in fluid connection with the channel. The fluid valve provides fluid flow control between the interior of the fluid container and the outside of the fluid container. The fluid valve has an internally threaded front region which screws into the externally threaded rear region of the screw, and an externally threaded rear region, onto which a fluid evacuation line is to be attached. A turning portion for turning the device into the wall of the container is located on the device. The fluid valve is provided with a fitting for connection to a suction line to thereby permit fluid to be drained from the fluid container when it is coupled with a drain line, and which otherwise remains closed. When the device is drilled into the fluid container, its screw will penetrate the wall of the fluid container and enter the fluid containing region thereof. The fluid valve will only open up when it is connected to a coupler on a suction line, to prevent the accidental release of any of the fluid being drained.

11 Claims, 3 Drawing Sheets

DEVICE FOR DRAINING FLUID FROM A CONTAINER

CROSS-REFERENCE TO RELATED APPLICATIONS

This is a continuation-in-part to U.S. patent application Ser. No. 08/300,402, filed Sep. 2, 1994, to James E. Clark for "DEVICE FOR DRAINING FLUID FROM A CONTAINER."

BACKGROUND OF THE INVENTION

1. Field of the Invention

This invention relates to the field of removing fluid from containers, and more particularly to a tool for insertion into the wall of a container with fluid, i.e. an oil filter, to permit the fluid to be evacuated therefrom, before the filter is removed from the motor or machinery, to avoid leakage of the fluid from the filter.

2. Description of the Prior Art

Lubrication systems in machinery, aircraft and vehicles require that their lubricants, viz., oil, and oil filters be replaced periodically in order to maintain the good working order of the engine and machinery. For passenger automobiles, many mechanics recommend a oil and filter change every 3,000 miles of travel to maintain maximum engine life. Professional truckers put thousands of miles on their trucks every week and wait many, many hours for oil changes over the course of a year.

Replacing the oil in a motor vehicle typically involves placing a large oil drain basin under the oil pan, removing the drain plug, thereby allowing the oil to drain therein, and unscrewing the oil filter from the engine block. Due to the engine designs of most engines, it has been difficult to remove oil filters without spilling oil onto the frame of the vehicle, on the mechanics and/or the ground. This is not only messy, but is environmentally unsound. Since many oil changes are conducted when the oil is very hot, this also poses a safety hazard to mechanics.

Attempts have been made to overcome these problems in changing oil filters. U.S. Pat. No. 4,177,529 to Sikula, Jr. discloses an oil filter draining wrench which has a cylindrical housing with a center punch for punching and draining oil from an oil filter. The filter wrench is hammered onto the filter. A rubber gasket at the open end of the cylindrical housing sealingly engages the outside of the oil filter, and prevents oil from leaking out around the punch. An oil drain outlet is used to drain the oil from the housing which collects it. In the tight engine compartments of modern motor vehicles, there is rarely enough space to place such a housing over the oil filter much less to swing a hammer.

U.S. Pat. Nos. 4,776,431 and 4,865,156 to Poling disclose oil change devices and methods which utilize punches and vacuum chambers. The vacuum chambers are attached by suction to the oil filter, and the punches are driven into the filter's sidewalls, penetrating the filter. The oil will thus be evacuated out of the filter, through the vacuum chamber, and out the evacuation tube. The Poling devices unduly rely on the vacuum seal thus established, and these devices would not be expected to operate reliably.

U.S. Pat. No. 5,299,714 to Kilgore discloses what is said to be a self-sealing oil filter punch, which is driven into the metal housing of an oil filter, so the oil can be drained through the hollow center of the punch and out the oil filter. The sharp tip of the punch is pushed through the bottom of the oil filter, and the punch has a resilient washer for sealing the punch against the oil filter's housing. A spigot valve is located on the end of the Kilgore device to control the oil flow through the punch. The Kilgore oil filter punch lacks means to positively engage the oil filter punch in fluid tight contact with the oil filter's housing, and jarring of the punch would be expected to unseat the seal. Moreover, if the spigot valve handle is advertently turned at an inopportune time, oil will spill out of the filter.

U.S. Pat. No. 1,248,251 to Breaux discloses a faucet which is bored into a barrel to gain access to its contents. The faucet has an auger at its tip, for drilling into the barrel, which transitions into a smooth, widening tapered shaft which is driven into the barrel to provide frictional sealing engagement with walls of the barrel. While the Breaux device may be acceptable for wood barrels, it would not be expected to function in the case of metal container, such as thin, metal-walled oil filters.

A patent application filed on or about Jul. 14, 1994, the names of David A. Kammeraad, Jack C. Canon and Dwain L. Kamphuis, assigned to K-Line Industries, Inc., and entitled "Tool and Method for Removing Fluid from a Container", teaches a drain tool with an expanding acme threaded screw portion and a Femco oil valve. The co-inventor herein James E. Clark II should have but was not named as co-inventor to the Kammeraad, et al. patent application.

The oil drain tools of the instant inventor's patent application Ser. No. 08/300,402 solve most of the problems inherent with the prior art, but are sometimes susceptible to breakage.

There accordingly remains a need for a filter draining fitting which is not only easy to use, simple in design, and which provides for leak proof operation, but which is designed to withstand long term use without damage.

BRIEF SUMMARY OF THE INVENTION

The invention provides a fluid container draining device which allows fluid to be removed from a fluid container in a controlled manner, said fluid container having walls defining a fluid filled interior region therebetween, said fluid container draining device comprising:

a threaded screw means having a sharpened tip at a forward region, which screw means when turned will penetrate the wall of the fluid container and enter the fluid containing cavity of the fluid container, said screw means having an internal channel communicating between an opening at the forward end of the screw means and a rear region of the threaded screw means, said rear region being externally threaded;

a means to provide fluid tight sealing between the screw means and the fluid container wall to prevent fluid leakage; and a fluid valve means positioned at the rear region of the screw means in fluid connection with the channel, said fluid valve means providing fluid flow control between the interior of the fluid container and the outside of the fluid container, said fluid valve means having an internally threaded front region which screws into the externally threaded rear region of the screw means, and an externally threaded rear region, onto which a fluid evacuation line is to be attached.

The invention further provides a fluid container draining device which allows fluid to be removed from a fluid container in a controlled manner, said fluid container having walls defining a fluid filled interior region therebetween, said fluid container draining device comprising:

a threaded screw means having a sharpened, drill tip at its forward region, an externally threaded rear region lying behind said sharpened drill tip, and an internal channel communicating between an opening at the forward region of the screw means and a rear region of the threaded screw means, which screw means will penetrate the wall of the fluid container and gain access to the fluid containing cavity of the fluid container;

a means to provide fluid tight sealing between the screw means and the fluid container wall to prevent fluid leakage from between the threaded screw means and the walls of the fluid container; and a fluid valve means positioned at the rear region of the screw means in fluid connection with the channel, said fluid valve means providing fluid flow control between the interior of the fluid container and the outside of the fluid container, said fluid valve means having an internally threaded front region which screws into the externally threaded rear region of the screw means, an externally threaded rear region, onto which a fluid evacuation line is attached, and a turning region used to drill the device into wall of the fluid container to drain the fluid contained therein.

DETAILED DESCRIPTION OF THE DRAWINGS

Figure 1:
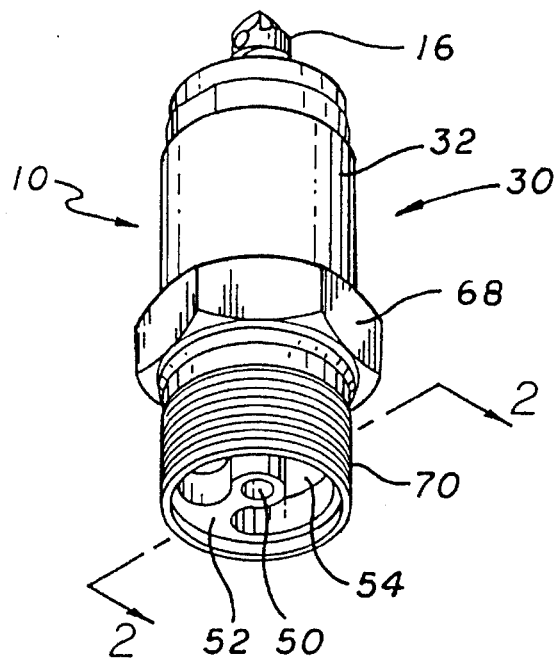
FIG. 1 is a perspective side view of the device for draining fluid from a container.
Figure 3:
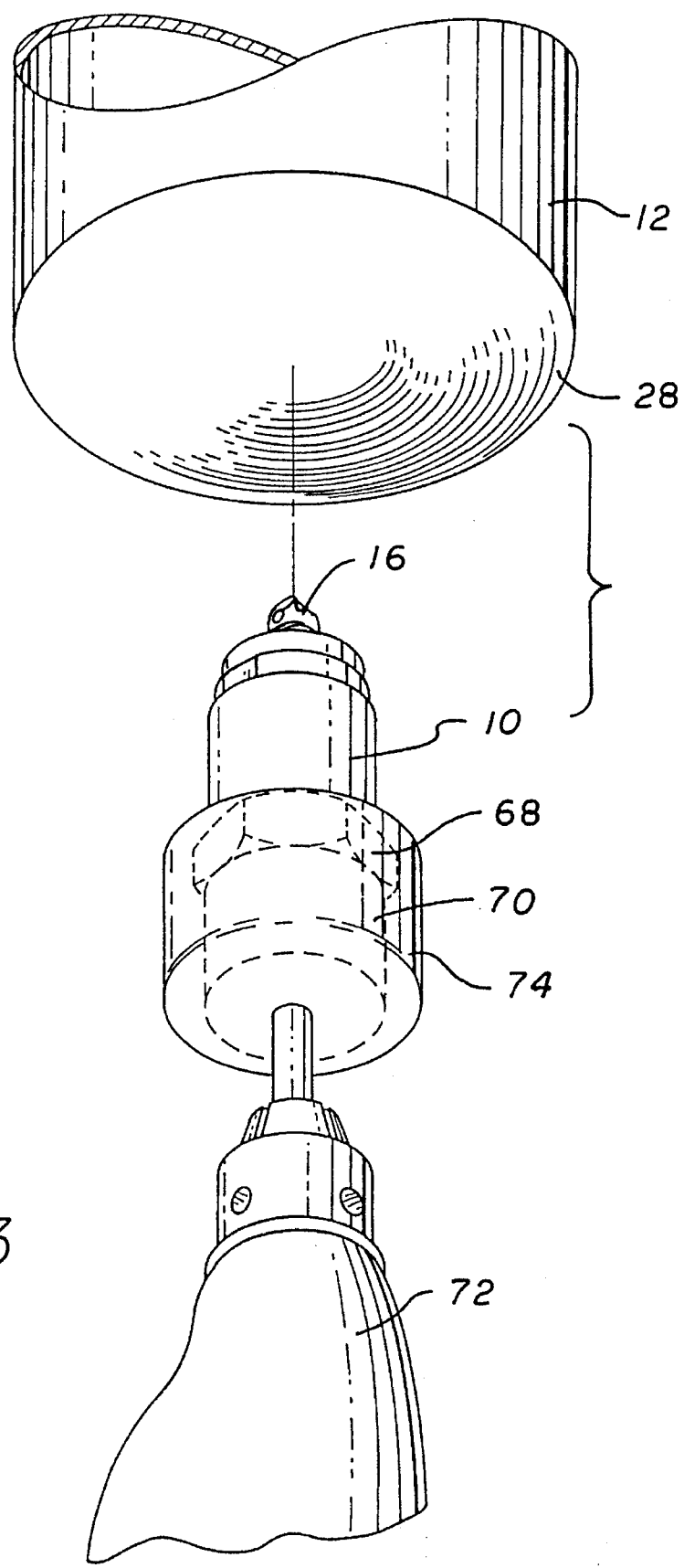
FIG. 3 is a perspective view of the device being drilled into the wall of a fluid container.

Referring to FIGS. 1 and 3, the device 10 for drawing fluid from a fluid container 12 is shown. In this figure, as well as the other figures described below, the container 12 is an oil filter, such as used for filtering the lubricants for motors and machinery. The device 10 of the invention can also be used to drain any number of containers, such as drums, cans, filters or pipes, of any number of fluids, e.g. lubricants, coolants, inks, and other chemicals.

Figure 2:
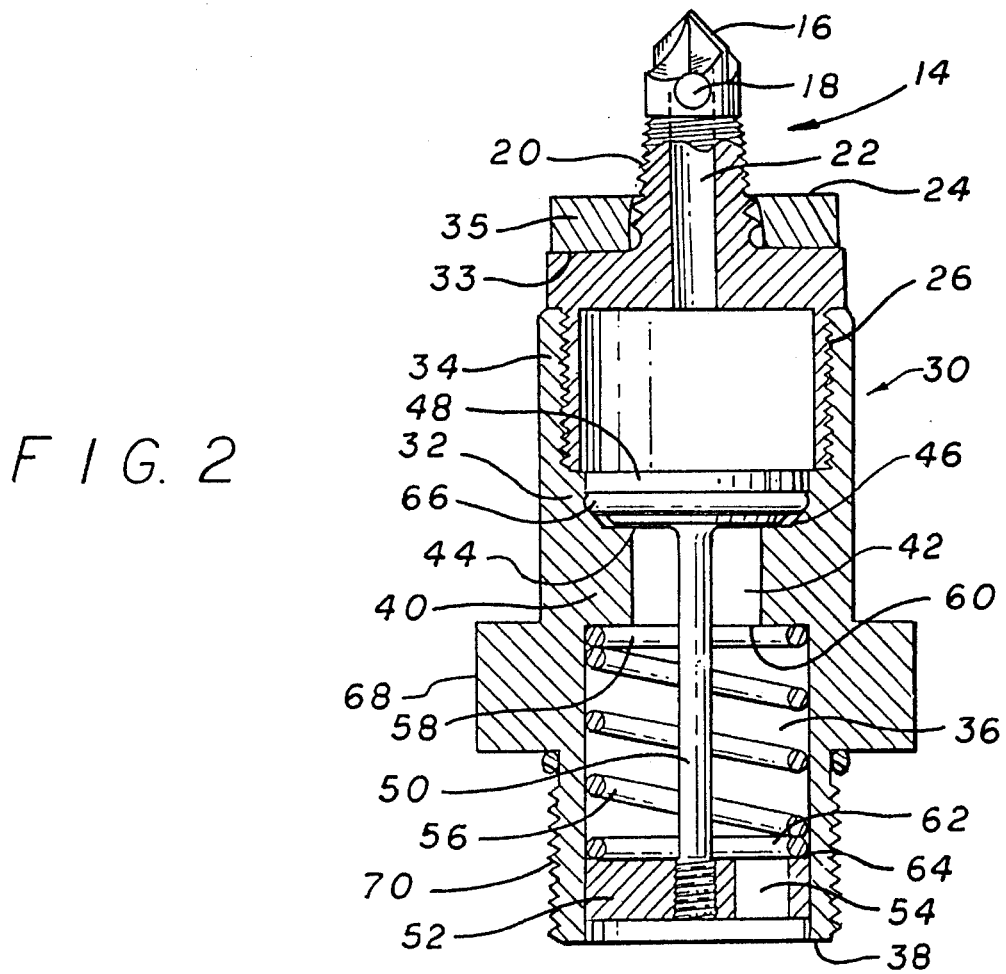
FIG. 2 is a cross-sectional view of the device through view lines 2—2 of FIG. 1.

Referring to FIG. 2, the device 10 includes a forwardly positioned threaded screw means portion 14. The threaded screw means portion 14 has a cutting and drilling tip 16, a fluid opening 18 located rearwardly of the cutting and drilling tip 16, and a male threaded screw portion 20 located rearwardly of the cutting and drilling tip 16. The fluid opening 18 leads to a screw means channel 22. A lip portion ("radially extending abutment surface") 24 is located behind the male threaded screw portion 20. A male threaded rear portion 26 is located rearward of the male threaded screw portion 20. To provide for enhanced sealing and retention between the wall 28 of the container 12 and the device 10, the male threaded screw portion 20 is preferably conical in shape and has expanding "Acme-type" threads to work its way through the walls 28 of the container 12 and forms a tight seal.

A valve portion 30 is positioned behind the screw means portion 14 and has a valve body 32 which has a female threaded front end 34, into which the male threaded rear portion 26 screws into liquid tightly. The lip portion 20 can comprise the leading front edge portion 33 of the valve body 32, or can be a separate piece, such as a washer 35.

A longitudinal bore 36 is formed through the rear end 38 of the valve body 32, and terminates at a inner wall 40 located behind the female threaded front end 34 of the valve body 32. A passage channel 42 passes through the inner wall 40. The forward face 44 of the inner wall 40 closest to the front of the valve portion 30 has a seating surface 46. A valve head 48 is sized to seat on the seating surface 46. The valve head 48 has a valve shaft 50 extending rearwardly through the passage channel 42 and through the longitudinal bore 36, and is connected to a pushing portion 52, which normally sits near the rear end 38 of the valve body 32. The pushing portion 52 has a opening 54 formed therethrough to permit fluid to flow therethrough, and the pushing portion 52 is sized to slide in the longitudinal bore 36. A biasing coil spring 56 is placed in the longitudinal bore 36 with its front end 58 contacting a rear face 60 of the inner wall 40 and with its rear end 62 contacting the inner side 64 of the pushing portion 52. This biasing coil spring 56 will thus bias the valve head 48 into sealing contact with the seating surface 46, and thus prevents the passage of any fluid through the passage channel 42. To provide for better sealing between the valve head 48 and the seating surface 46, an O-ring 66 is preferably placed on the valve head 48. A hex turning area 68 is located on the valve body 32, in front of a male threaded rear end 70 of the valve body. As best shown in FIG. 3, the device 10 is driven into the wall 28 of the container 12 by a drill 72 with a socket wrench 74 which fits over the rear end 70 and on the hex turning area 68.

Figure 4:
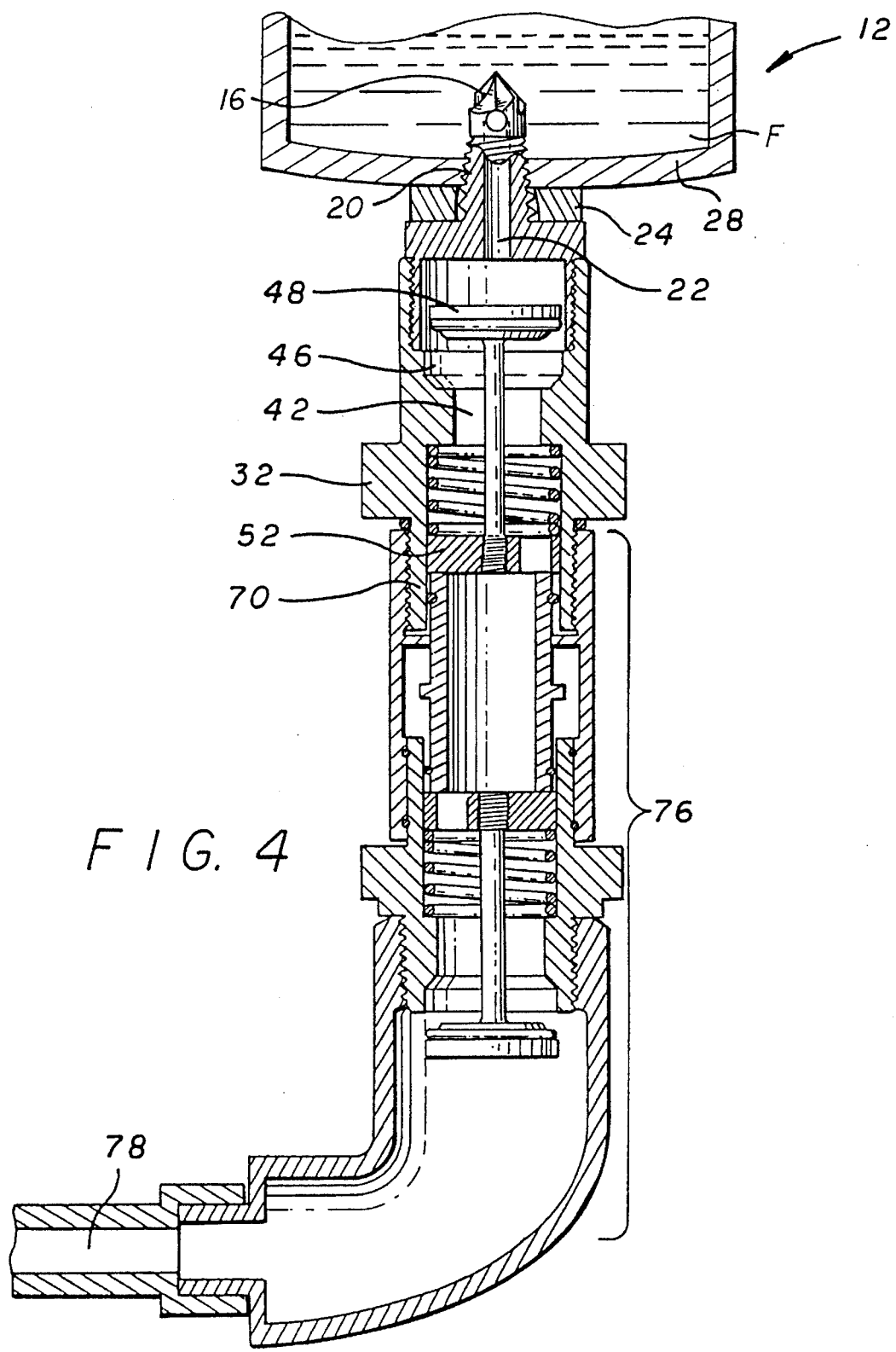
FIG. 4 is a partially exposed top view of the embodiment of FIG. 3, with the socket of a drill removed, and with its oil valve connected to a valve coupler and fluid transfer line, to evacuate fluid from the fluid container.

Referring to FIGS. 3 and 4, as the device 10 is screwed through the wall 28 and into the fluid container 12, its cutting and drilling tip 16 cuts its way through the wall 28, and then the male threaded screw portion 20 will screw into the wall 28, forming a liquid tight seal. When the lip portion 24 contacts the wall 28 of the container 12, it tends to drawn in the metal of the wall 28 into tighter contact with the threads 20 and lip portion 24, and further prevents the tool 10 from punching in the wall 25 of the container.

FIG. 4 shows the device 10 engaged on a container 12—here an oil filter, and with a valve actuating coupler 76 attached to it. When the valve actuating coupler 76 is screwed onto the male threaded rear end 70 of the valve body 32, it pushes the pushing portion 52 and thus unseats the valve head 48 from the seating surface 46, and thus open up the passage channel 42 for fluid flow. A vacuum line 78 is connected to the valve actuating coupler 76. When vacuum is applied, fluid "F" is thereby evacuated from the container 12, through the fluid opening 18, the screw means channel 22, the now open passage channel 42, the valve actuating coupler 74, and out the vacuum line 76. The valve activating coupler 76 is the subject of a U.S. patent filed contemporaneously by the same inventors, and entitled, "LEAKPROOF DUAL ACTION FLUID TRANSFER VALVE."

After the fluid "F" is completely withdrawn from the fluid container 12, the coupler 76 with its vacuum line 78 are disconnected from the device 10. In cases where the container 12 is an oil filter, it can be unscrewed with the device 10 still screwed in, or the device 10 can be removed prior to removing the oil filter 12. As the coupler 76 is unscrewed from the device 10, the valve head 48 reseats on the seating surface 46, to thereby block the passage channel 42, so no fluid escapes. If desired, a cap (not shown) can be screwed onto the male threaded rear end 70 of the valve body 32 while the device is being screwed into the fluid supply.

The above described device 10 provides an easy, fast, and clean device to drain fluid from a fluid containing vessel, such as oil filters, before the oil filter is removed from the vehicle or machine.

The drawings and the foregoing description are not intended to represent the only form of the invention in regard to the details of its construction and manner of operation. In fact, it will be evident to one skilled in the art that modifications and variations may be made without departing from the spirit and scope of the invention. Changes in form and in the proportion of parts, as well as the substitution of equivalents, are contemplated as circumstances may suggest or render expedient; and although specific terms have been employed, they are intended in a generic and descriptive sense only and not for purpose of limitation, the scope of the invention being delineated in the following claims:

We claim:

1. A fluid container draining device which allows fluid to be removed from a fluid container in a controlled manner, said fluid container having walls defining a fluid filled interior region therebetween, said fluid container draining device comprising:

a threaded screw means having a sharpened tip at its forward region, which screw means is adapted to penetrate the wall of the fluid container and enter the fluid containing cavity of the fluid container, said screw means having an internal channel communicating between an opening at the forward end of the screw means and a rear region of the threaded screw means, said rear region being externally threaded;

a means to provide fluid tight sealing between the screw means and the fluid container wall to prevent fluid leakage from between the threaded screw means and the walls of the fluid container;

a turning surface adapted for engagement with a drill to permit said fluid container draining device to be turned to drill and screw said threaded screw means into the wall of the fluid container to engage the fluid container draining device therewith, independent of other means to retain the device in contact with the fluid container; and a fluid valve means positioned at the rear region of the screw means in fluid connection with the channel, said fluid valve means providing fluid flow control between the interior of the fluid container and the outside of the fluid container by only opening up when it is coupled with a fluid evacuation line, and otherwise remaining closed, said fluid valve means having an internally threaded front region which screws into the externally threaded rear region of the screw means, and an externally threaded rear region, onto which a fluid evacuation line is to be attached.

2. The fluid container draining device of claim 1, wherein the means to provide fluid tight sealing between the screw means and the fluid container's walls to prevent fluid leakage comprises a radially extending abutment surface located rearward of the tip of the threaded screws means, wherein when said abutment surface is tightly abutted against the wall of the fluid container, a seal is formed therewith.

3. The fluid container draining device of claim 1, wherein the fluid filter draining device will drain fluid from a fluid filler while the fluid filter is still positioned on the fluid container.

4. The fluid container draining device of claim 1, wherein the fluid container is an oil filter for a motor.

5. The fluid container draining device of claim 1, wherein the means to provide fluid tight sealing between the screw means and the fluid container's walls comprises a threaded body with a sealing surface on a front face held in tight contact against the wall of the fluid container by screw means.

6. The fluid container draining device of claim 1, wherein the means to provide fluid tight sealing between the screw means and the fluid container's walls comprises the threaded screw means being male threaded and tapered and expanding from a narrower front drill tip region to a wider rear region, which male threaded and tapered and expanding screw means, when screwed into the fluid container's walls, fluid tightly seals therewith.

7. A fluid container draining device which allows fluid to be removed from a fluid container in a controlled manner, said fluid container having walls defining a fluid filled interior region therebetween, said fluid container draining device comprising:

a threaded screw means having a sharpened, drill tip at its forward region, an externally threaded rear region lying behind said sharpened drill tip, and an internal channel communicating between an opening at the forward region of the screw means and a rear region of the threaded screw means, which screw means will penetrate the wall of the fluid container and gain access to the fluid containing cavity of the fluid container;

a means to provide fluid tight sealing between the screw means and the fluid container wall to prevent fluid leakage from between the threaded screw means and the walls of the fluid container;

a turning surface adapted for engagement with a drill to permit said fluid container draining device to be turned to drill and screw said threaded screw means into the wall of the fluid container to engage the fluid container draining device therewith, independent of other means to retain the device in contact with the fluid container; and a fluid valve means positioned at the rear region of the screw means in fluid connection with the channel, said fluid valve means providing fluid flow control between the interior of the fluid container and the outside of the fluid container by only opening up when it is coupled with a coupler connected to a fluid suction line to evacuate fluid from the container, said fluid valve means otherwise remaining closed, said fluid valve means having an internally threaded front region which screws into the externally threaded rear region of the screw means, an externally threaded rear region, onto which said coupler on said fluid suction line is attached, and a turning region used to drill the device into wall of the fluid container to drain the fluid contained therein.

8. The fluid container draining device of claim 7, wherein said fluid valve means is adapted to fit a coupler connection to a suction line to thereby permit fluid to be evacuated from the fluid container.

9. The fluid container draining device of claim 7, wherein the fluid container is an oil filter for a motor vehicle.

10. The fluid container draining device of claim 7, wherein the fluid valve means comprises a valve which is only opened up when it is coupled with a drain line, and which otherwise remains closed.

11. The fluid container draining device of claim 7, wherein the means to provide fluid tight sealing between the screw means and the fluid container's walls comprises the threaded screw means being male threaded and tapered and expanding from a narrower front drill tip region to a wider rear region, which male threaded and tapered and expanding screw means, when screwed into the fluid container's walls, fluid tightly seals therewith.

* * * * *